Dec. 8, 1970  R. W. BATT ET AL  3,545,202
WALL STRUCTURE AND COMBUSTION HOLES FOR A GAS TURBINE ENGINE
Filed April 2, 1969

INVENTORS
RICHARD W. BATT
PERRY GOLDBERG
ALEXANDER KURTI
IRWIN SEGALMAN

BY James A. Kane
AGENT

United States Patent Office 3,545,202
Patented Dec. 8, 1970

3,545,202
WALL STRUCTURE AND COMBUSTION HOLES FOR A GAS TURBINE ENGINE
Richard W. Batt, Wethersfield, Perry Goldberg and Alexander Kurti, West Hartford, and Irwin Segalman, Bloomfield, Conn., assignors to United Aircraft Corporation, East Hartford, Conn., a corporation of Delaware
Filed Apr. 2, 1969, Ser. No. 812,748
Int. Cl. F02c 3/00; F23d 11/00
U.S. Cl. 60—39.65                                     6 Claims

ABSTRACT OF THE DISCLOSURE

A combustion wall and liner construction which utilizes a unique wall geometry to maintain the liner wall exposed to the combustion gases at an acceptable operating temperature. Additionally, a construction wherein air dilution conduits or flow passageways for conducting the flow of dilution air into the combustion chamber is described. The construction is such that it maintains the cooling flow through a plurality of flow channels which are intersected by the conduits.

CROSS-REFERENCES TO RELATED APPLICATIONS

U.S. application Ser. No. 812,761 filed Apr. 2, 1969 entitled Joint Construction in a Combusion Chamber and Method of Making Therefor, U.S. application Ser. No. 812,607 filed Apr. 2, 1969 entitled Wall Structure and Method of Manufacturing, and U.S. application Ser. No. 812,793 filed Apr. 2, 1969 entitled Wall Structure For a Gas Turbine Engine, all contain subject material related to the disclosure presented herein.

BACKGROUND OF THE INVENTION

The present invention relates to a heat resistant wall construction, and more particularly to a wall construction which has particular utility in the hot temperature environment of a gas turbine engine.

In most gas turbine applications the combustion chambers, either main burner or afterburner, utilize a cooled liner or wall construction to limit the temperature of the main load bearing structures of the engine. In the main burner application this liner also serves to control the fuel-air distribution in the primary combustion zone and to permit controlled mixing of unburned air with the combustion products to achieve desired turbine inlet temperature profiles.

The liner or wall construction which actually defines a combustion zone within which the combustion or burning occurs, attempts to limit the temperature of the liner will itself and the temperature of the surrounding main load bearing structural members by reducing the radiation from the combustion gasse and by preventing the combustion gases from coming into direct contact with structural members. The prior art constructions to achieve this dual purpose have generally employed two constructions; first, a convection cooled arrangement and secondly a film cooled arrangement. In the convectively cooled arrangement a flow of cooling air is introduced between the liner wall and the structural members, while in the film cooling arrangement, a stream or streams of cooling air are introduced into the liner or combustion zone through a plurality of louvers.

The conventional or prior art combustion chambers or afterburners have a number of drawbacks. For example, these constructions require large quantities of cooling air, hence reducing the air available for combustion and/or dilution in the case of the main burners. This in turn has resulted in limiting the thrust augmentation achievable with afterburners and in the case of the main burners longer combustion chambers to achieve the desired turbine inlet temperature profiles with the reduced dilution air. These obviously result in weight and performance penalties for the gas turbine engine.

Another problem encountered with the prior art constructions is that the flow patterns and other variables existing within a combustion chamber or afterburner make it virtually impossible to match the heat removed from the liner walls by the cooling air with the heat being convected and radiated to the walls by the combustion gases. As a result of being unable to provide uniform protection, large thermal gradients and accompanying stress loads are present, even in the most effectively cooled liner. As a further result of these thermal gradients, eventual failure of the liner or wall can be expected within a relatively short operating cycle.

Finally, the requirement that a combustion chamber have combustion holes or dilution holes is extremely common. In the construction contemplated by the present invention, the use of dilution holes presents a problem because of the additional requirement of maintaining a cooling flow in a plurality of flow channels downstream of the dilution holes. More specifically, with the use of typical or conventional prior art dilution holes, the cooling fluid would exit therethrough with the result that the liner portion downstream of the dilution holes would not be cooled.

The present invention provides a burner construction which avoids the principal problems encountered by the prior art constructions. More specifically, the present invention provides a construction in which the cooling air requirements are reduced by approximately 50 percent when compared with conventional prior art constructions. Additionally, the construction provides a liner or a wall structure which is substantially free from thermal gradients, therefore, improving the life characteristics of the burner. It also provides a construction where the cooling air does not mix with the combustion gases until the most efficient use of the cooling stream has been made, while maintaining the hot wall temperature substantially uniform across its entire length.

An additional feature of the present invention is that it provides a construction wherein combustion or dilution air holes are mounted in a double wall liner while maintaining the characteristics and essential features of the double wall structure.

The description and discussion heretofore has been directed and limited to a construction which has particular utility in the hot environs of a gas turbine engine; however, it should be noted that the present invention has utility in many other environments, e.g., anywhere a double wall structure confining a fluid between the two walls is utilized.

SUMMARY OF THE INVENTION

It is a primary objective to provide a wall construction which has particular utility in a gas turbine engine. More particularly the wall construction is employed to form a liner or wall construction in the hot environments of a gas turbine engine, the construction being such as to maintain the wall and surrounding structural members at an acceptable operating temperature without subjecting these members to adverse thermal gradients. Additionally, the wall structure provides a structure by which the necessary combustion or dilution of air is provided without affecting the foregoing objective.

By way of illustration and for the sake of convenience and brevity, the construction of the present invention will be described in connection with a combustion chamber. It should be realized that the construction has utility in other structural members such as an afterburner or turbine nozzle vanes; however, the description will be limited and directed at a burner or combustion chamber construction.

To achieve the above objective, the burner or combustion chamber includes a liner or wall construction which comprises a pair of radially spaced walls. The radial space is actually a flow passageway which extends over the entire length of a liner wall segment. The flow passageway in turn comprises a plurality of relatively small cross-sectional area flow channels, the flow channels being formed by either openings or through the use of a corrugated strip member. In the most preferred burner embodiment, a plurality of double wall segments are joined to one another to provide the axial length of the burner liner. As hereinbefore stated, each of the flow channels extends over the entire length of the wall segments; therefore, each of the flow channels has a relatively large length-to-diameter (equivalent hydraulic diameter) ratio. In fact, this ratio is of extreme significance and should be in the range of 10 to 200. For a more detailed explanation of the significance of controlling the frictional pressure losses, reference is made to copending application, U.S. Ser. No. 812,793, filed Apr. 2, 1969, by P. Goldberg et al., entitled Wall Structure For a Gas Turbine Engine, referred to above.

Another feature of the present invention is that since the flow channels extend over the entire length and since the control of the cooling flow can be accurately controlled the temperature of the inner wall is maintained at a uniform level. Therefore, the adverse thermal gradient and stress loads are substantially eliminated.

An additional feature of the construction of the present embodiment is the joint construction utilized in joining the liner segments to one another. More specifically, the segments are joined to one another in a stepped arrangement such that the discharge of the flow channel is directed along the inner walls of each segment. To accomplish this, the cross-sectional area of adjoining segments is such that the cross-sectional area of the upstream segment is smaller than the adjoining cross-sectional area of the downstream adjacent segment. In this type construction and with the discharge of the flow channels being arranged as they are, the effectiveness of the cooling stream is greatly enhanced. Reference is hereby made to copending application, U.S. Ser. No. 812,761, filed Apr. 2, 1969 by R. Batt et al., entitled Joint Constuction in a Combustion Chamber and Method of Making Therefor, referred to above, which describes this construction in greater detail.

Another feature of the construction of the present embodiment is the provision of combustion or air dilution holes positioned around the circumference of the combustion chamber. To provide this feature, a toroidal member is inserted through the outer wall and inner wall and the flow channels of the liner. The toroidal member has a circumferential passageway which is in communication with each of the flow channels the toroidal member intersects. As a result, an uninterrupted flow path is continuously provided between all of the flow channels, and therefore, the cooling stream flow to all of the flow channels is insured. One of the functions of the toroidal member is to provide dilution or combustion air to the combustion chamber, and to this end, the inlet or opening of the toroidal member is curved and contoured to provide penetration of the dilution air into the chamber.

DESCRIPTION OF THE PREFERRED EMBODIMENT

The invention is shown in a diffuser case 10 which is intended to be located between the compressor and turbine of a gas turbine powerplant. A powerplant to which this type combustion chamber is applicable is disclosed, for example, in the Savin patent, U.S. Pat. No. 2,747,367.

Figure 1:
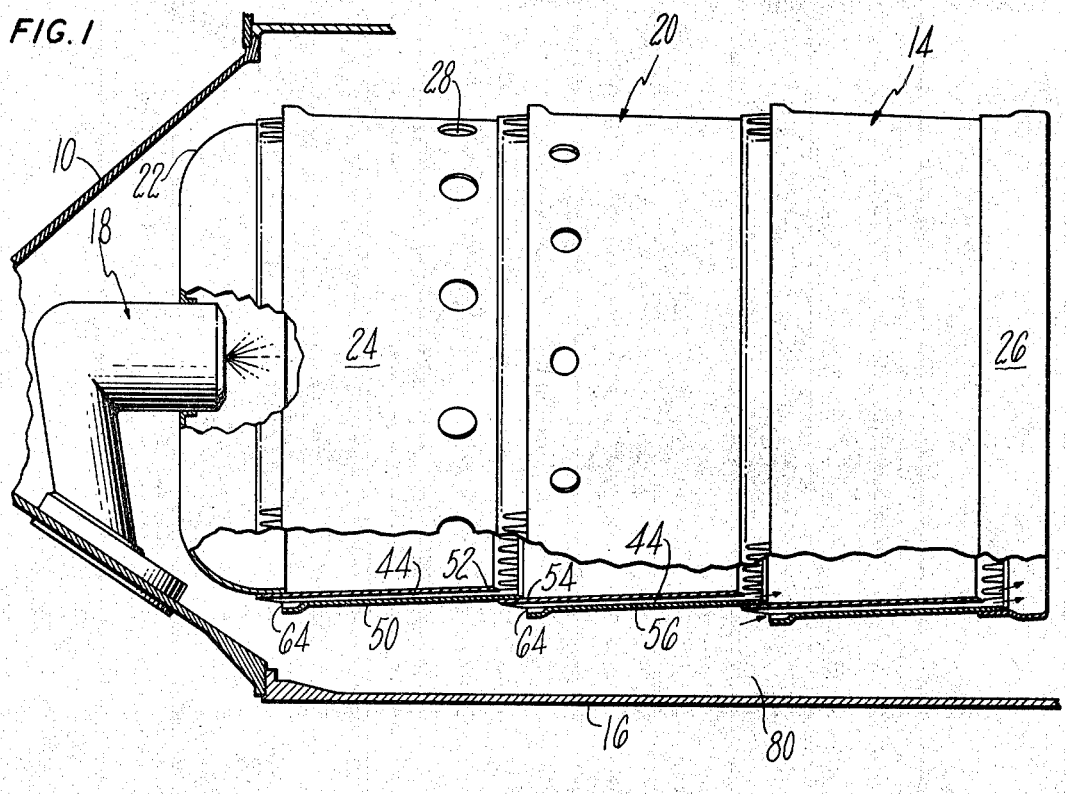
FIG. 1 is a partial cross-sectional view of the burner apparatus, the burner apparatus including a liner wall means utilizing the construction of the present invention.

As best shown in FIG. 1, the combustion chamber is of a can-annular type, only one can herein being illustrated. It is to be understood that any type combustion chamber may be employed whether it be can-annular type or an annular type. Again referring to FIG. 1, the combustion chamber 14 consists of casing 16, fuel nozzle 18 and liner 20. Liner 20 includes a dome-shaped member 22 and is the closure member of liner 20. Additionally, liner 20 includes an upstream end 24 where primary combustion occurs and an open end or downstream end 26 wherein the exhaust or combustion gases are discharged to a turbine not shown herein.

As indicated, high pressure compressor discharge air enters the diffuser case 10 and flows toward the head end of the combustion chamber. A portion of this air enters liner 20 through a plurality of combustion holes 28 hereinafter described in greater detail which are positioned in each segment of liner 20. As has hereinbefore been stated, it is essential that the liner and structural members surrounding the liner be maintained within an acceptable operating temperature range. To achieve this objective, the liner 20 has a unique construction.

Figure 2:
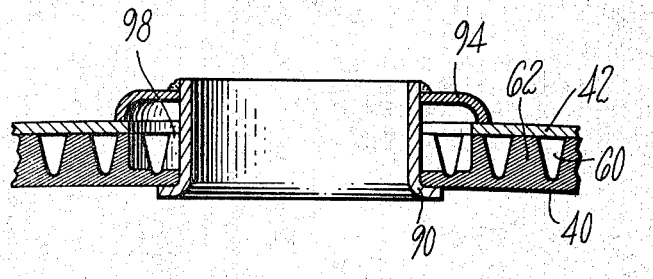
FIG. 2 is an enlarged view taken transversely through a flow connecting means showing one embodiment of the dilution air holes.

Referring first to FIG. 2, a preferred embodiment of the present invention is illustrated. As shown, liner 20 includes a pair of radially spaced walls, first wall 40 and second wall 42. In this construction the first wall 40 is the inner wall of the liner end confining wall or boundary for the hot combustion gases. As such, it is directly exposed to these relatively hot streams and it therefore becomes necessary to maintain inner wall 40 within the acceptable operating temperature range. As hereinbefore stated, walls 40 and 42 are radially spaced from one another and therefore form flow passageway 44 therebetween. For purposes hereinbefore described the flow passageway extends over the entire length of each liner segment. More specifically, in the liner utilized in the present embodiment, liner 20 comprises a plurality of segments 50, the downstream end 52 being attached and supported from the upstream end 54 of the next adjacent liner segment 56. This construction and the axial or lengthwise extending flow passageway 44 is more clearly shown in FIG. 1.

Referring again to FIG. 2, it is shown that flow passageway 44 actually comprises a plurality of relatively small flow channels 60 extending around the entire circumference of liner 20. Additionally, these flow channels 60 extend over the entire length of each of the liner segments and hence over the entire length of liner 20. In the embodiment illustrated in FIG. 2, the flow channels 60 are openings formed by a plurality of ribs 62 extending from one of the walls herein shown as inner wall 40. More specifically, the flow channels 60 are formed by a plurality of ribs or flanges 62 extending from wall 40 to wall 42, each of the ribs 62 being spaced from one another, however, being relatively close to one another and therefore forming the relatively small cross-sectional area flow channels 60.

The cross-sectional area of flow channels 60 is of extreme importance and in the most preferred embodiment the equivalent hydraulic diameter of each of the flow channels is in the range of .01 inch to .200 inch. The geometry of the flow channels is significant because it is this feature of the liner construction which controls the heat transfer rate from the hot combustion gases and inner wall. More specifically, a cooling stream of air is introduced into the flow passageway inlets as at 64, this cooling air being relatively cooler than the hot combustion gases. This cooling stream flows through each of the flow channels 60 and hence effectively provides a flow of cooling fluid around the entire circumference and along the entire length of the liner 20.

As hereinbefore mentioned, the geometry of these flow channels 60 are unique for the geometry establishes and controls the frictional pressure losses of the cooling stream flowing therethrough. To provide a combustion chamber with a liner construction, as shown, it was determined that to maintain wall 40 at an acceptable operating temperature that a relationship exists between the cross-sectional area of the flow channels and the length of each flow channel. More specifically, to establish and control the frictional pressure losses of the cooling stream flowing through the flow channels so as to establish a heat transfer rate from the hot inner wall to the cooling stream and therefore maintain the temperature of wall 40 within an acceptable operating limit, a length-of-diameter (equivalent hydraulic diameter) ratio in the range of 10 to 200 has been found to be the most preferred.

FIG. 1 also illustrates the joint construction feature of the present embodiment. As shown, only two liner segments 50 and 56 are illustrated. First segment 50, as shown herein, has a smaller cross-sectional area at its downstream end 52 with respect to the upstream end 54 of second segment 56. As a result, the two segments can be joined in a stepped fashion and it should be clear that any other segments whether forward or rearward of segments 50 and 52 can be similarly joined.

Another unique feature of the construction illustrated herein is that the cooling stream travels through the flow channels over the entire length of the segment and is discharged or directed along the inner wall of the next downstream segment. In this way, the cooling stream is effectively used in that, first, it is not scrubbed away from the convectively cooled wall, and secondly, it provides an additional heat sink which can be utilized in maintaining the wall temperature of the downstream wall segment.

Figure 3:
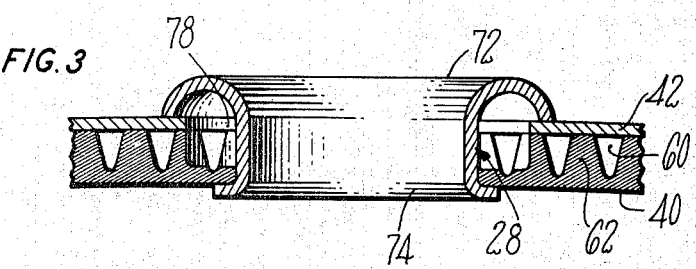
FIG. 3 is an enlarged view showing a second embodiment of the air dilution or combustion hole construction of the present invention.

Referring to FIG. 3 the dilution or combustion hole construction is illustrated. As shown, a portion of inner wall 40, the flow channels 60 and outer wall 42 are machined out or removed from the wall structure. Into the portion or sections removed from these members is inserted a flow connecting means 28. The flow connecting means includes an inlet 72 positioned in the outer wall 42 and an exit 74 positioned in the inner wall 40. The flow connecting means 28 is inserted transversely to the axis of the combustion chamber 14 and the axis of flow connecting means 28 is substantially radial of combustion chamber 14. Only one flow connecting means 28 is illustrated in FIG. 3 for the sake of brevity; however, it should be understood that any number of flow connecting means 28 may be positioned around the circumference of liner 20 in the manner hereinbefore described.

The problem encountered when inserting an air dilution hole into a liner with a construction of the type described herein is that an arrangement must be provided so that the cooling stream may reach flow channels 60 downstream of the air dilution hole. Flow connecting means 28 accomplishes this with a unique construction. As illustrated in the present embodiment, flow connecting means 28 through which the dilution air is fed or led into combustion chamber 14 is a toroidal shaped member. To provide the necessary flow path between the flow channels upstream and downstream of the toroidal member 72, toroidal member has an annular or circumferential groove 78 which is in communication with passageway 44. As a result, circumferential groove 78 is in communication with each and every flow channel that it intersects and therefore provides a flow means for the continuous uninterrupted flow of the cooling stream from the flow channels upstream of the flow connecting means 28 to the flow channels downstreams of the flow connecting means.

Referring again to FIG. 2 another embodiment of the flow passageway means or dilution air hole 28 is illustrated. In this embodiment a two piece construction is utilized and comprises a first passageway means or conduit 90 which is inserted into the opening between inner wall 40 and outer wall 42. It is pointed out that the construction and function of conduit 90 is the same as flow means 28 of FIG. 3 and has the same structural elements performing the same functions with a distinction hereinafter described. The distinction is a second flange 94 which extends from outer wall 42 to conduit 90. Second flange 94 is fastened or connected to conduit 90 in such a manner as to form an annular circumferential groove 98. Circumferential groove 98 serves the same function as circumferential groove 78 of FIG. 3. More specifically, it provides a means for supplying an adequate flow of cooling fluid from the flow channels upstream of the flow means 28 to the flow channels downstream of the flow means 28.

We claim:

1. A combustion chamber for use in a gas turbine engine including a housing, a liner spaced radially therefrom, the liner including an inner wall and an outer wall, each of the walls being radially spaced from one another and forming an annular flow passageway, means in the annular flow passageway separating the annular flow passageway of a cooling stream of fluid, the flow channels extending the entire length of the liner and having a predetermined length-to-cross-sectional area relationship so as to control the frictional pressure losses of the cooling stream passing through the flow channels, control of these losses controlling the temperature of the liner wall exposed to the combustion gases, the liner having a substantially closed end and an open end spaced axially therefrom the combustion products being discharged through the open end, fuel nozzle means positioned at the closed end of the liner for supplying fuel to be combusted within the liner and swirl vanes surrounding the fuel nozzle means wherein the improvement comprises:

the liner having a plurality of dilution air conduits, the conduits being positioned around the circumference of the liner and extending through the outer wall, the inner wall and the flow channels, the conduit including means for continuously conducting the uninterrupted flow of the cooling stream to the flow channels downstream of the conduits from the flow channels upstream of the conduits.

2. A combustion chamber as in claim 1 wherein;

the flow conducting means in the conduit is a circumferential header, at least a portion of the header being positioned between the inner wall and the outer wall and thereby providing communication between all the flow channels intersected by the conduit.

3. A combustion chamber as in claim 2 wherein;

each of the conduits has a rounded and contoured inlet positioned in the outer wall to assist the penetration of the dilution air into the combustion chamber.

4. A combustion chamber as in claim 3 wherein;

the centerline of each of the conduits is substantially radial with respect to the engine centerline.

5. A wall structure comprising a double wall liner; a first wall providing a boundary for confining a first stream of fluid; a second wall spaced from the first wall; first means between said first and second walls for separating the space into a plurality of flow channels, each of the flow channels having a predetermined length-to-cross-sectional area ratio so as to control frictional pressure losses of the second stream of fluid supplied to the flow channels; said wall structure having second means for permitting the passage of a stream of fluid through the wall structure, said second means extending through the double wall structure and across the flow channels, and said second means conducting the flow of the second stream of fluid continuously from the flow channels upstream to the flow channels downstream of said means; said second means comprising a toroidal member having an inlet positioned in the first wall and an exit positioned in the second wall, said toroidal member having an axis transverse to the flow channels; said toroidal member having a hollow circumferential passageway, said passageway being in communication with each of the flow channels upstream thereof and each of the flow channels downstream thereof, said circumferential passageway thereby providing an uninterrupted flow between the flow channels upstream of the toroidal member and downstream of the toroidal member.

6. A wall structure as set forth in claim 5 wherein; the inlet of each of the toroidal members is contoured and rounded to provide penetration of a fluid passing therethrough into the first stream of fluid.

References Cited

UNITED STATES PATENTS

| | | | |
|---|---|---|---|
| 2,617,255 | 11/1952 | Niehus | 60—39.65 |
| 2,672,728 | 3/1954 | Stockdale | 60—39.65 |
| 2,919,549 | 1/1960 | Haworth et al. | 60—39.65 |
| 3,038,309 | 6/1962 | Waters | 60—39.66 |
| 3,407,596 | 10/1968 | Dasbach et al. | 60—39.66X |

DOUGLAS HART, Primary Examiner

U.S. Cl. X.R.

60—39.66; 431—352